United States Patent
Mak

(10) Patent No.: US 9,295,940 B2
(45) Date of Patent: Mar. 29, 2016

(54) CONFIGURATIONS AND METHODS FOR HIGH PRESSURE ACID GAS REMOVAL IN THE PRODUCTION OF ULTRA-LOW SULFUR GAS

(75) Inventor: John Mak, Santa Ana, CA (US)

(73) Assignee: Fluor Technologies Corporation, Sugar Land, TX (US)

( * ) Notice: Subject to any disclaimer, the term of this patent is extended or adjusted under 35 U.S.C. 154(b) by 513 days.

(21) Appl. No.: 13/579,506

(22) PCT Filed: Feb. 17, 2010

(86) PCT No.: PCT/US2010/024382
§ 371 (c)(1),
(2), (4) Date: Nov. 12, 2012

(87) PCT Pub. No.: WO2011/102830
PCT Pub. Date: Aug. 25, 2011

(65) Prior Publication Data
US 2013/0055729 A1   Mar. 7, 2013

(51) Int. Cl.
*B01D 53/14* (2006.01)

(52) U.S. Cl.
CPC ........ *B01D 53/1425* (2013.01); *B01D 53/1462* (2013.01); *B01D 2252/202* (2013.01); *B01D 2252/2021* (2013.01); *B01D 2252/2023* (2013.01); *B01D 2252/2025* (2013.01); *B01D 2252/20431* (2013.01)

(58) Field of Classification Search
None
See application file for complete search history.

(56) References Cited

U.S. PATENT DOCUMENTS

| | | | |
|---|---|---|---|
| 2,826,266 A | 3/1958 | Hachmuth et al. | |
| 3,594,985 A | 7/1971 | Ameen et al. | |
| 4,397,660 A | 8/1983 | Van der Pas-Toornstra | |
| 5,453,559 A | 9/1995 | Phillips et al. | |
| 5,490,873 A | 2/1996 | Behrens et al. | |
| 7,377,967 B2* | 5/2008 | Reddy et al. | 96/242 |
| 2005/0000360 A1* | 1/2005 | Mak et al. | 95/236 |
| 2005/0172807 A1* | 8/2005 | Mak | 95/235 |
| 2006/0032377 A1* | 2/2006 | Reddy et al. | 96/234 |
| 2006/0110300 A1* | 5/2006 | Mak | 422/190 |
| 2006/0150812 A1* | 7/2006 | Mak et al. | 95/199 |
| 2006/0266214 A1* | 11/2006 | Won | 95/234 |
| 2008/0184887 A1* | 8/2008 | Mak | 95/174 |
| 2010/0000255 A1* | 1/2010 | Mak | 62/625 |
| 2010/0111784 A1* | 5/2010 | Mak et al. | 422/190 |
| 2012/0073441 A1* | 3/2012 | Mak | 95/246 |

FOREIGN PATENT DOCUMENTS

| | | |
|---|---|---|
| CN | 1723073 A | 1/2006 |
| EP | 0173908 A2 | 8/1958 |
| JP | 61-181515 A | 8/1986 |

(Continued)

*Primary Examiner* — Duane Smith
*Assistant Examiner* — Phillip Shao
(74) *Attorney, Agent, or Firm* — Conley Rose, P.C.; Kristin Jordan Harkins

(57) ABSTRACT

Acid gas is removed from a high pressure feed gas that contains significant quantities of CO2 and H2S. In especially preferred configurations and methods, feed gas is contacted in an absorber with a lean and an ultra-lean solvent that are formed by flashing rich solvent and stripping a portion of the lean solvent, respectively. Most preferably, the flash vapors and the stripping overhead vapors are recycled to the feed gas/absorber, and the treated feed gas has a CO2 concentration of less than 2 mol % and a H2S concentration of less than 10 ppmv, and more typically less than 4 ppmv.

8 Claims, 1 Drawing Sheet

(56) References Cited

FOREIGN PATENT DOCUMENTS

| JP | 2005-538841 A | 12/2005 |
| JP | 2006-509628 A | 3/2006 |
| JP | 2007521350 A | 8/2007 |
| WO | 2004/026441 A1 | 4/2004 |
| WO | 2004/052511 A1 | 6/2004 |
| WO | 2004/058384 A1 | 7/2004 |
| WO | 2005/035101 A1 | 4/2005 |

* cited by examiner

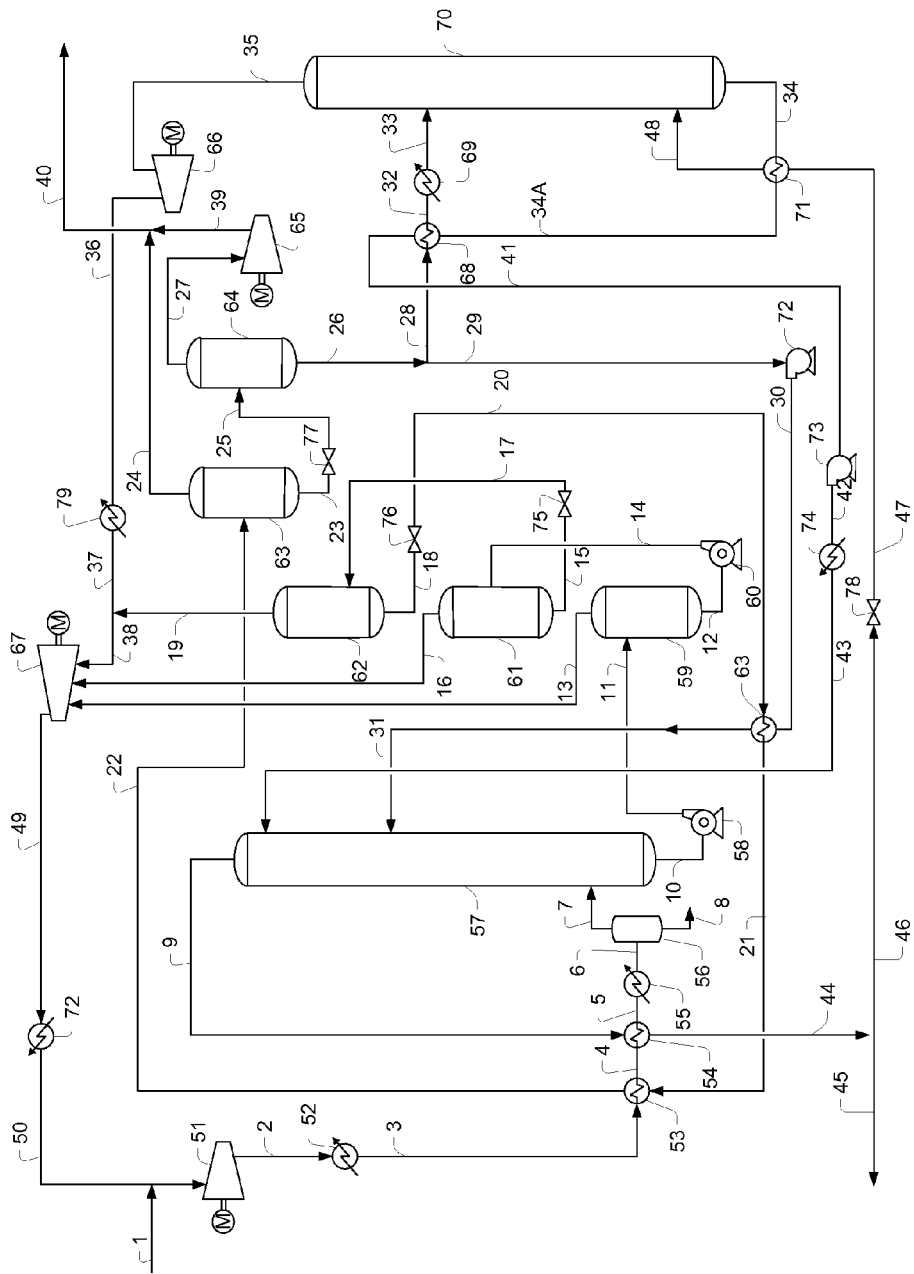

CONFIGURATIONS AND METHODS FOR HIGH PRESSURE ACID GAS REMOVAL IN THE PRODUCTION OF ULTRA-LOW SULFUR GAS

FIELD OF THE INVENTION

The field of the invention is removal of acid gases from a feed gas, and particularly relates to acid gas removal from high pressure gases with high CO2 and H2S content to so produce an ultra-low sulfur pipeline quality gas.

BACKGROUND OF THE INVENTION

As many low sulfur natural gas fields are being depleted, natural gas production from sour gas fields has become increasingly necessary to meet current energy demands. However, acid gas removal from sour gas fields, and especially from highly sour gas fields (e.g., acid gases at or above 10 mol % CO2 and at or above 0.5 mol % H2S) typically requires significant capital investment and operating costs. Moreover, gas production facilities face the challenge of increasing acid gas content during production, especially where CO2 is re-injected into the formation.

For example, acid gases can be removed by conventional amine processes, however, such processes are often not economical due to the need for ever increasing amine circulation at increasing acid gas content in the feed gas, which requires higher steam heating duty in the solvent regeneration, leading to increased greenhouse gas emissions. Moreover, chemical solvents have an upper limit in their acid gas loading capacity (i.e., mole of acid gas per mole of amine), which is inherently dictated by the chemical equilibrium between amine and the acid gases. On the other hand, physical solvents operate on the principal of Henry's law. Thus, acid gas loading of the solvent actually increases with the acid gas content of the feed gas, making physical solvents a desirable choice for highly sour gas fields. Moreover, the solvent regeneration processes for physical solvents are also often less problematic as these solvents can be regenerated to some extent by flash regeneration, which eliminates the need of heating, which in turn minimizes greenhouse gas emissions.

However, flash regeneration of physical solvents without external heating can only partially regenerate the solvent and is in most cases not suitable to treat highly sour gases to meet pipeline gas specifications (e.g., 1 mol % CO2 and 4 ppmv or lower H2S). These issues are exacerbated when the feed gas to be treated contains significant amounts of hydrocarbons as the physical solvent tends to absorb most of the hydrocarbons, resulting in a higher hydrocarbon contents in the CO2 stream and a lower the heat content in the treated gas stream.

One exemplary configuration and methods of acid gas removal using physical solvent is described in our copending International application PCT/US09/58955 where acid gas is removed at high pressure with a lean physical solvent, and where the rich solvent is heated (e.g., using waste heat from compressor discharge and lean solvent) and subjected to flash regeneration to so regenerate the lean solvent. Such approach advantageously reduces heat requirements for regeneration; however, it is in most cases only suitable for feed gases with relatively low H2S content where treated gas must conform to pipeline specification. In other known exemplary configuration and methods, CO2 is absorbed in a physical solvent at high pressure as described in WO 2005/035101A1. Here, the lean solvent is regenerated via flashing and dual stripping where carbon dioxide in an atmospheric flash vapor strips the H2S from the rich solvent, while sweet gas strips the carbon dioxide from the solvent in the stripper. Despite the significant advantages using such system, such methods and configurations are once more limited to feed gases with relatively low (about 90 ppmv) H2S content. Similarly, U.S. Pat. No. 7,192,468 discloses methods and configurations in which CO2 is absorbed at high pressure to form a rich solvent that is then regenerated over multiple flash stages and a stripping column using a H2S free gas. However, such configuration recovers the stripper overhead as fuel gas, which may require further treating, and is generally not desirable in facilities with excess fuel gas supply.

In yet further known configurations and methods of acid gas removal, the solvent is regenerated over multiple flashing stages as described in U.S. Pat. No. 7,637,987. Here, the flashed solvent is then stripped in a stripper using the recycle gas from the flash stages and fed to an absorber that is operated with an isothermal gradient or with a decreasing top-to-bottom thermal gradient. While such configurations and methods provide several significant advantages over other known systems, various disadvantages nevertheless remain. Among other things, when recycle gas is employed as stripping gas, the flow rate is limited by the CO2 that can be flashed off in the high pressure stage, which may not be sufficient to fully regenerate the solvent when used to treat a high H2S content feed gas.

Thus, although various configurations and methods are known to remove acid gases from a feed gas, all or almost all of them suffer from one or more disadvantages. Among other things, and especially where H2S levels in feed gas is relatively high, use of physical solvent without heat application is typically not suitable to produce a treated gas that meets gas pipeline specifications. Therefore, there is still a need to provide improved methods and configurations for acid gas removal.

SUMMARY OF THE INVENTION

The present invention is directed to configurations and methods of removing acid gases from a high-pressure feed gas having relatively high CO2 and H2S concentrations using a physical solvent to produce a treated gas that complies with pipeline specifications. In most typical aspects, the feed gas has a pressure of at least 500 psig (more typically at least 1000 psig), and will comprise at least 10 mol % (and more typically at least 30 mol %) CO2, and at least 0.01 mol % (and more typically at least 1 mol %) H2S.

It is further preferred that the feed gas is chilled and treated by two solvent streams, a lean solvent and an ultra-lean solvent, which are produced by flash regeneration and lean-gas stripping of a portion of the lean solvent, respectively. Most preferably, flashed hydrocarbons are recovered by recycling the flash gases in multi-stage separators, thereby reducing hydrocarbon losses to less than 5%, preferably less than 4%, and most preferably less than 2%.

In one aspect of the inventive subject matter, a method of removing acid gas from a feed gas that has a CO2 content of at least 10 mol % and an H2S content of at least 0.01 mol % (and more typically CO2 content of at least 20 mol % and an H2S content of at least 1.0 mol %) includes a step of feeding a lean physical solvent and an ultra-lean physical solvent at different locations into an absorber to counter-currently contact the feed gas thereby producing a rich physical solvent and a treated gas. Most typically, the absorber is operated at a pressure of at least 500 psig, more typically at least 750 psig, and most typically at least 1000 psig. In another step, the lean physical solvent is regenerated in a flash regeneration section, and a first portion of the lean physical solvent is then sent to the absorber while a second portion of the lean physical solvent is fed to a stripping column to so produce the ultra-lean physical solvent. So produced treated gas will have an H2S content of less than 4 ppmv, and more typically less than 2 ppmv, and a CO2 content of less than 2 mol %, and more typically less than 1 mol %.

In especially preferred methods, the hydrocarbon-containing recycle gas is formed in the flash regeneration section and the recycle gas is fed to the feed gas or absorber, and/or the stripping column produces an overhead product that is combined with the recycle gas. It is further generally preferred that a portion of the treated gas (H2S depleted) is used as a stripping gas in the stripping column, and that refrigeration content from expansion of the portion of the treated gas is used for cooling the ultra-lean physical solvent. Where desirable, the heat content of the feed gas may be used in the flash regeneration section to produce a CO2-containing flash vapor, preferably at pressures of less than 100 psig. While not limiting to the inventive subject matter, it is generally preferred that the feed gas is compressed and chilled using flashed solvent to a temperature sufficient to condense C5+ hydrocarbons.

Consequently, the inventor also contemplates a method of treating a rich physical solvent in which the rich solvent is flashed across multiple successive stages from a first pressure to a second pressure to generate a hydrocarbon-containing flash gas and a flashed solvent. The so produced flashed solvent is then heated and further flashed from the second pressure to a third pressure to thereby generate a CO2-containing flash gas and a lean solvent. A portion of the lean solvent is then stripped in a stripping column to produce a stripping column overhead product gas and an ultra-lean solvent.

Most typically, the hydrocarbon-containing flash gas and the stripping column overhead product are combined and recycled back to an absorber. Where desired, the flashed solvent may be heated using heat content from the absorber feed gas and/or the lean solvent. Most typically, the first pressure is at least 1000 psig, the second pressure is at least 75 psig, and the third pressure is equal or less than 40 psig, and the lean solvent and the ultra-lean solvent are fed into the absorber at different positions, wherein the absorber is operated at a pressure of at least 500 psig. It is further generally preferred that the step of stripping the portion of the lean solvent is performed using treated feed gas from an absorber as a stripping gas, and/or that the portion of the lean solvent is between 20% and 50% of the lean solvent.

Thus, the inventor also contemplates a plant for acid gas removal from a feed gas, wherein the plant includes an absorber that receives a feed gas and produces a treated gas at a pressure of at least 500 psig (and more typically at least 1000 psig), wherein the absorber separately receives a lean physical solvent and an ultra-lean physical solvent and produces a rich physical solvent. A flash regeneration section is fluidly coupled to the absorber to receive the rich physical solvent and to produce the lean physical solvent from the rich physical solvent, while a stripping column is fluidly coupled to the flash regeneration section to receive a first portion of the lean physical solvent and to produce the ultra-lean physical solvent from the lean physical solvent. In most typical plants, a first conduit is coupled to the flash regeneration section and provides a second portion of the lean physical solvent to the absorber while a second conduit is coupled to the stripping column and provides the ultra-lean physical solvent to the absorber.

It is generally preferred that the flash regeneration section has a plurality of flash vessels and a plurality of respective conduits to feed the flash vapors from the flash vessels to the absorber and/or feed gas. Moreover, it is generally preferred that the flash regeneration section comprises a plurality of hydraulic turbines to recover at least some work and refrigeration. Typically, contemplated plants will also include a third conduit that is coupled to the stripping column and provides a stripping column overhead product to the absorber. While not limiting to the inventive subject matter, it is preferred that the plants will also include a chiller and a separator operationally coupled to the absorber to chill the feed gas to a temperature sufficient to condense and separate C5+ hydrocarbons from the feed gas.

Various objects, features, aspects and advantages of the present invention will become more apparent from the following detailed description of preferred embodiments of the invention.

BRIEF DESCRIPTION OF THE DRAWING

FIG. 1 is an exemplary schematic of a plant for acid gas removal using a physical solvent according to the inventive subject matter.

DETAILED DESCRIPTION

The inventor discovered that feed gases with relatively high CO2 and H2S content can be treated in an effective and conceptually simple manner to produce a pipeline compliant product by subjecting the feed gas to a dual physical absorption using a lean and an ultra-lean solvent, wherein the lean solvent is formed from flashed heated rich solvent in a process that allows recycling of the flash gases to minimize hydrocarbon loss, and wherein the ultra-lean solvent is formed from flashed heated rich solvent in a stripping column that uses the treated feed gas as a stripping gas to achieve a very low concentration of acid gases in the ultra-lean solvent.

In especially preferred aspects of the inventive subject matter, hydrocarbon rich flash gases are produced in a series of flash vessels to minimize hydrocarbons losses, and the so formed acid gas enriched flashed solvent is heated and further letdown in pressure to at least one separator operating under subatmospheric pressure to produce an acid gas stream and a lean solvent. A stripping column will further strip a portion (preferably 20% to 50%) of the lean solvent from the last stage separator using a portion of the treated gas to produce an ultra-lean solvent with a H2S content of less than 100 ppmv, more preferably less than 10 ppmv and most preferably less than 4 ppmv.

Therefore, contemplated methods and configurations may also be characterized by the presence of an absorber that receives a chilled feed gas, a lean physical solvent, and an ultra-lean physical solvent. Most typically, the feed gas and the solvents are cooled by external refrigeration and internal refrigeration that is generated from flashing of the rich solvent. The feed gas typically comprises at least 10 mol %, more typically at least 20 mol %, and mostly typically at least 30% CO2, and at least 1000 ppmv and most preferably at least 1 mol % H2S. Moreover, the feed gas is typically at elevated pressure of at least 200 psig, more typically at least 400 psig, and most typically at least 600 psig. Depending on the particular nature and CO2 content of the feed gas, it is preferred to further increase the pressure of the feed gas to at least 700 psig, more preferably to at least 1000 psig, and most preferably to at least 1200 psig. Where desirable, contemplated plants will also include one or more heat exchangers and/or a feed gas chiller to chills the feed gas to a temperature suitable for condensation and subsequent removal of the bulk of the heavier hydrocarbons (e.g., C5+).

Consequently, in especially contemplated methods of method of removing acid gas from a feed gas having a CO2 content of at least 10 mol % and an H2S content of at least 0.01 mol %, feed gas is counter-currently passed through an absorber at a pressure of at least 500 psig and brought into contact with a lean physical solvent and an ultra-lean physical solvent, which are fed into the absorber at different locations. The so formed rich physical solvent is then regenerated in a flash regeneration section to produce a lean physical solvent. One portion of the lean physical solvent is fed to the absorber, while another portion of the lean physical solvent is fed to a stripping column to produce the ultra-lean physical solvent.

Viewed from a different perspective, the inventor therefore also contemplates a method of treating a rich physical solvent in which the rich solvent is flashed in multiple successive stages from a first pressure to a second pressure to generate a hydrocarbon-containing flash gas and a flashed solvent, which is heated and further flashed from the second pressure to a third pressure to generate a CO2-containing flash gas and a lean solvent. A portion of the lean solvent is then stripped (preferably with treated gas) in a stripping column to produce a stripping column overhead product and an ultra-lean solvent.

Flashing of the rich solvent is preferably performed under conditions that allow for recovery of methane and ethane (preferably at least 90%, and even more preferably at least 95%) while heating is preferably accomplished using waste heat from the feed gas, lean solvent, and/or compressor discharge. Among other benefits, contemplated configurations and methods allow for reduction in external refrigeration and cooling water consumption by using the flashed rich solvent in cooling the lean solvent to the absorber, and then in cooling the feed gas compressor discharge to reduce cooling water consumption. Additionally, or alternatively, at least a portion of the absorber overhead treated gas can be used in chilling the feed gas to the absorber minimizing the feed gas chiller refrigeration requirement.

For example, one contemplated plant configuration according to the inventive subject matter is depicted in FIG. 1. Dry feed gas stream 1, typically with 12 mol % CO2 and 0.1 mol % H2S, at 100° F. and 650 psig is mixed with the recycle gas stream 50 and compressed by compressor 51 forming stream 2, at about 1200 psig and 170° F. As used herein, the term "about" in conjunction with a numeral refers to a range of that numeral starting from 20% below the absolute of the numeral to 20% above the absolute of the numeral, inclusive. For example, the term "about −100° F." refers to a range of −80° F. to −120° F., and the term "about 1000 psig" refers to a range of 800 psig to 1200 psig. The compressor discharge is cooled by an exchanger (e.g., ambient cooler) 52 forming stream 3, at about 120° F. The extent of cooling in exchanger 52 can be adjusted as necessary to provide the heating requirement for solvent regeneration. Stream 3 is further cooled in exchanger 53 by the rich solvent stream 21 to about 10° F. to form stream 4, and in exchanger 54 by the treated gas stream 9 to about 0° F., forming stream 5 which is finally cooled in exchanger (e.g., propane chiller) 55 using external refrigeration to about −20° F. The chilled stream 6 is further processed in separator 56, producing a hydrocarbon liquid stream 8 which can be further processed (not shown) for sales, and a vapor stream 7 that is feed to absorber 57.

The chilled feed gas stream 7 is counter-currently scrubbed by lean solvent stream 31 in the lower section and then by an ultra-lean solvent 43 in the upper section, producing a treated gas stream 9 at about −12° F. and a rich solvent stream 10. Most typically, the absorber contains conventional contacting devices, including packings or trays, or other suitable media for acid gas absorption.

The rich solvent stream is letdown in pressure via the first hydraulic turbine 58 to about 750 psig, forming stream 11, at about −8° F. The letdown stream is separated in separator 59, producing a flashed vapor stream 13 and a flashed liquid stream 12. The flashed liquid is further letdown in pressure via a second hydraulic turbine 60 to about 250 psig, forming stream 14. The letdown stream is separated in separator 61, producing a flashed vapor stream 16 and a flashed liquid stream 15. It should be recognized that in such configurations the hydraulic turbine operates as an energy efficient device as it generates refrigeration cooling by expansion and flashing of the acid gas content while providing shaft work to provide work (e.g., to drive the solvent circulation pump or generate electric power).

The flashed solvent stream 15 is further letdown in pressure in JT valve 75 to about 90 psig forming stream 17 at about −11° F. The letdown stream is separated in separator 62, producing a flashed vapor stream 19 and a flashed liquid stream 18. The flashed liquid is further letdown in pressure via JT valve 76 to about 60 psig, forming stream 20 at about −14° F. The refrigeration content in the flashed solvent is recovered in exchanger 63 by chilling the lean solvent stream 30. In this exchanger, the flashed solvent is heated to about −10° F. forming stream 21, which is further heated by the feed gas stream in exchanger 53. Stream 22 is separated in separator 63 operating at about atmospheric pressure, producing a flashed vapor stream 24 and a flashed liquid stream 23 which is letdown in pressure in JT valve 77 to vacuum pressure of about 2 to 3 psia forming stream 25. The letdown stream is separated in the vacuum separator 64, producing a flashed vapor stream 27 and a flashed liquid stream 26.

The flashed liquid stream 26 is split into stream 28 and stream 29 such that 20% to 80%, preferably 25% to 75%, and most preferably 30% to 70% of stream 26 are routed via stream 28 to the stripping column 70. Stream 29 is pumped by pump 72 to about 1300 psig forming stream 30 which is cooled in exchanger 63 using the self generated refrigeration from the flashed solvent stream 20 prior to feeding to the mid section of the absorber. Stream 28 is heated by exchanger 68 using the residual heat from the ultra-lean solvent stream 34A to form stream 32, which is further heated using waste heat from the compressor discharge (or other waste heat source) in exchanger 69 to about 80° F. to 120° F., forming stream 33 feeding the stripper 70. It should be appreciated that such high feed temperature enhances the stripping process, which is required to produce an ultra-low sulfur content treated gas.

For effective stripping, about 2 to 5% of the high pressure treated gas, stream 44, is used as stripping gas stream 46 while the remainder is fed as stream 45 to a pipeline or other destination. To even further improve the energy efficiency of the stripping process, the high pressure stripping gas stream 46 is letdown in pressure by JT valve 78 to form stream 47 which is heated by stream 34 in exchanger 71 to about 100° F. forming stream 48 prior to entering the bottom of the stripper. The refrigeration produced by the JT cooling is recovered in cooling the ultra-lean solvent. In most instances, it is preferred that the stripping gas to solvent flow is maintained at a volumetric ratio of about 5 to 30. Typically, the stripping operation can produce an ultra-lean solvent with less than 10 ppmv H2S content that can be used for treating the feed gas to meet the ultra-low sulfur pipeline specification (2 ppmv). The CO2 content can be reduced to below 0.1 mole %. Most typically, the stripper contains contacting devices, including packing or trays, or other suitable media for acid gas stripping.

The stripper produces an acid gas rich overhead vapor 35 and an ultra-lean solvent 34. Ultra-lean solvent 34 is cooled by exchange with stream 47 in exchanger 71 to form stream 34A, still further cooled in exchanger 68 to form stream 41, which is then pumped to absorber pressure by pump 73 forming stream 42, which is further cooled in cooler 74 prior to entry into the absorber 57. The overhead vapor is compressed by compressor 66 to about 90 psig, forming stream 36 which is cooled in exchanger 79 to form stream 37 prior to mixing with stream 19. Combined stream 38 is fed to the low stage of compressor 67. Compressor 67 further compresses flashed vapor streams 13 and 16, producing a compressed vapor stream 49 at about 650 psig, which is cooled in exchanger 72, prior to recycling to the absorber or feed gas.

The CO2 streams 24 and 39 (which is drawn from vacuum pump 65) are combined forming stream 40 that can be used for EOR. The hydrocarbon content in stream 40 is typically less than 5 mole %.

With respect to suitable feed gases it should be appreciated that the pressure of such gases may vary considerably, and that the nature of the gas will at least in part determine the pressure. However, it is particularly preferred that the feed gas has a pressure of at least 400 psig, more typically at least 750 psig, even more typically at least 1000 psig, and most typically at least 1200 psig. Where desirable, the pressure of the feed gas may be increased using a compressor that compresses the feed gas, alone or in combination with the recycle gas. Similarly, the nature of the solvent may vary considerably, and all physical solvents and mixtures thereof are deemed appropriate for use herein. There are numerous physical solvents known in the art, and exemplary preferred physical solvents include FLUOR SOLVENT™ (propylene carbonate), NMP (normal-methyl pyrolidone), SELEXOL™ (dimethyl ether of polyethylene glycol), and TBP (tributyl phosphate), and/or various polyethylene glycol dialkyl ethers. Alternatively, other solvents including enhanced tertiary amine (e.g., Piperazine) or other solvent or a mixture of solvents may be employed having similar behavior as physical solvent. Chemical solvents are generally not preferred. Thus, especially suitable solvents include those other than chemical solvents.

Flashing of the rich solvent may be performed using numerous devices, and it is generally contemplated that all pressure reduction devices are suitable for use herein. However, with respect to the amount of pressure reduction, it is typically preferred that the rich solvent (after providing work and/or cooling) is let down in pressure to a pressure sufficient to release (preferably without heating) flashed vapors with methane content of about 20 to 70%. These vapors are recycled to the absorber minimizing methane losses to less than 5% and most preferably less than 1%.

Consequently, it is contemplated that configurations according to the inventive subject matter will significantly reduce overall energy consumption and capital cost for high acid gas removal (CO2 at least 10 mol %, more typically at least 30 mol % and H2S at least 0.5 mol %, more typically 1 mol %) as compared to conventional acid gas removal processes including amine or other physical solvents or membranes. Moreover, contemplated configurations and processes will typically not require an external heat source, and heat if required will be supplied by the feed gas and/or heat of compression (which may originate from refrigeration systems and/or feed gas compression systems), thus further reducing energy consumption and impact on the environment. Additionally, it should be noted that enhanced oil recovery projects will frequently encounter an increase in acid gas concentration in the feed gas, typically from 10% up to as high as 60%. Contemplated configurations and processes can accommodate these changes with essentially the same solvent circulation.

Another advantage of contemplated methods and configurations is their simplicity requiring less supporting offsite and utility systems, such as steam boilers or fuel gas heating. For example, contemplated configurations for treatment of a high acid gas feed gas can employ refrigeration from the flashing of the physical solvent for process cooling, minimizing cooling water consumption. The only utility requirement is electric power, and additional cooling (if necessary) may be performed with ambient air or cooling water, greatly reducing environment impacts.

Thus, specific embodiments and applications for configurations and methods for improved acid gas removal have been disclosed. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

What is claimed is:

1. A method of removing acid gas from a feed gas having a CO2 content of at least 10 mol % and an H2S content of at least 0.01 mol %, comprising:
    feeding a lean physical solvent and an ultra-lean physical solvent at different locations into an absorber to countercurrently contact the feed gas to produce a rich physical solvent and a treated gas;
    wherein the absorber is operated at a pressure of at least 500 psig;
    regenerating the lean physical solvent using a flash regeneration section and feeding a first portion of the flashed lean physical solvent to the absorber; and
    feeding a second portion of the flashed lean physical solvent to a stripping column and using a portion of the treated gas as a stripping gas to so produce the ultra-lean physical solvent.

2. The method of claim 1 further comprising a step of producing a hydrocarbon-containing recycle gas in the flash regeneration section and feeding the recycle gas to the feed gas or absorber.

3. The method of claim 1, wherein the stripping column produces an overhead product that is combined with the recycle gas.

4. The method of claim 1 wherein the portion of the treated gas used as a stripping gas in the stripping column is between 2 to 5% of the treated gas.

5. The method of claim 4 wherein refrigeration content from expansion of the portion of the treated gas is used for cooling the ultra-lean physical solvent.

6. The method of claim 1 wherein heat content of the feed gas is used in the flash regeneration section to produce a CO2-containing flash vapor.

7. The method of claim 1 further comprising a step of compressing the feed gas and chilling the compressed feed gas to a temperature that is sufficient to condense C5+ hydrocarbons.

8. The method of claim 1 wherein the feed gas has a CO2 content of at least 20 mol % and an H2S content of at least 0.1 mol %, and wherein the treated gas has an H2S content of equal or less than 4 ppmv.

\* \* \* \* \*